Sept. 1, 1959 L. D. REEL 2,902,311
TUBULAR LOADING MECHANISM
Filed Feb. 25, 1957 8 Sheets-Sheet 1

Sept. 1, 1959 L. D. REEL 2,902,311
TUBULAR LOADING MECHANISM
Filed Feb. 25, 1957 8 Sheets-Sheet 6

Leo D. Reel
INVENTOR.
BY Hayden & Pravel
ATTORNEYS

United States Patent Office 2,902,311
Patented Sept. 1, 1959

2,902,311

TUBULAR LOADING MECHANISM

Leo D. Reel, Houston, Tex.

Application February 25, 1957, Serial No. 641,983

9 Claims. (Cl. 294—87)

The present invention relates to a mechanism for moving or loading tubular members such as pipe, bar metal, and the like.

At the present time, tubular members such as pipe, casing, drill pipe and tubing are stored on racks until it is needed, whereupon it is loaded on a transport vehicle for carrying to the location where it is needed. The tubular members are moved from the racks at the point of storage on to the vehicles by manual means. More particularly, a sloping ramp is formed by the parties loading the pipe, such ramp generally being formed by pieces of 2 x 12 or other timber of suitable strength extending from adjacent the rack where the pipe is stored up to the bed of the truck or vehicle on which the members are to be carried.

The pipe is then loaded manually by a man grasping each end of the pipe and rolling it up the platform and on to the truck bed. Generally, where the pipe is longer than the width of the truck bed, the platform is arranged at the side of the truck so that when the pipe is rolled up the ramp and into position on the truck bed, it will extend longitudinally thereof. This type of loading is continued until a layer of pipe is formed upon the truck bed, whereupon a second layer is stacked upon the first layer and a third layer, and so forth, until the desired load has been placed on the truck. Thereafter, boomers or other suitable holding mechanism are provided for securing around the stacked pipe for holding it in position on the truck as it is being transported to the location where it is to be used.

When the pipe reaches the location for use, the unloading operation follows the loading operation except in reverse. For example, the chain boomers tongs are released and the pipe is rolled down the ramp formed of timbers or other suitable material and dumped at the location for use.

It is readily obvious that this manual method of racking or storing pipe for transport to a location for use, or in moving the pipe about the yard where it may be stored, is time consuming and expensive.

The present invention provides a mechanism for engaging a number of tubular members whereby they may be simultaneously moved about the storage yard, as desired, or they may be positioned on a truck for transporting to another location.

An object of the present invention is to provide a mechanism for engaging a plurality of tubular members the mechanism including means which engages each tubular member so as to hold it in the mechanism, said means having additional means associated therewith which normally maintains the engaging means in retracted position so that the mechanism may be lowered into tubular member engaging position and the engaging means thereafter actuated so as to hold the tubular members as it is being lifted and moved or loaded on a truck or other vehicle.

Still a further object of the present invention is to provide a mechanism for engaging a plurality of pipe, the mechanism including means which engages each pipe so as to hold it in the mechanism, said means having additional means associated therewith which normally maintains the engaging means in retracted position so that the mechanism may be lowered into pipe engaging position and the engaging means thereafter actuated so as to hold the pipe as it is being lifted and loaded on a truck or other vehicle, said engaging means releasing from the pipe when the mechanism sets the pipe down.

Yet a further object of the present invention is to provide a tubular loading mechanism including a frame, said frame having spaced parallel elongated members and each of the frame members having tubular receiving portions therein which are aligned whereby the tubular members may be positioned in the aligned portions, gripping means adjacent each pipe receiving portion in said frame members for engaging the pipe therein and holding it, and additional means for lifting the mechanism while it is engaged with the pipe whereby the pipe may be moved about or stacked as desired.

Yet a further object of the present invention is to provide a method and apparatus which eliminates the manual method of moving pipe in a storage yard and eliminates the manual method of loading tubular members on a vehicle.

Yet a further object of the invention is to provide a tubular loading mechanism including frame members which are spaced and adapted to engage a plurality of tubular members such as pipes, there being means associated with said frame members for holding the engaged pipe in the pipe receiving portions, said last mentioned means being constructed and arranged so as to remain in inactive position until a predetermined time, whereupon it may thereafter be actuated so as to engage and hold the pipes as they are being lifted by the mechanism and moved about.

Another object of the present invention is to provide a loading mechanism which automatically locks the engaged elongated members in the mechanism and which automatically releases the members from the mechanism at a desired time.

Other and further objects and advantages of the invention will become more readily apparent from a consideration of the following description and drawings, wherein:

Fig. 6 is a partial end view similar to that of Fig. 1, but showing the lifting means and its cooperation with the actuating means to hold the gripping means in engagement with the tubular members as the mechanism is being lifted or moved about;

Fig. 7 is a vertical sectional view on the line 7—7 of

Fig. 1, showing in enlarged detail the arrangement for restraining the actuating means, Fig. 8 is an isometric view of one of the depending members of the engaging means;

Figure 1:
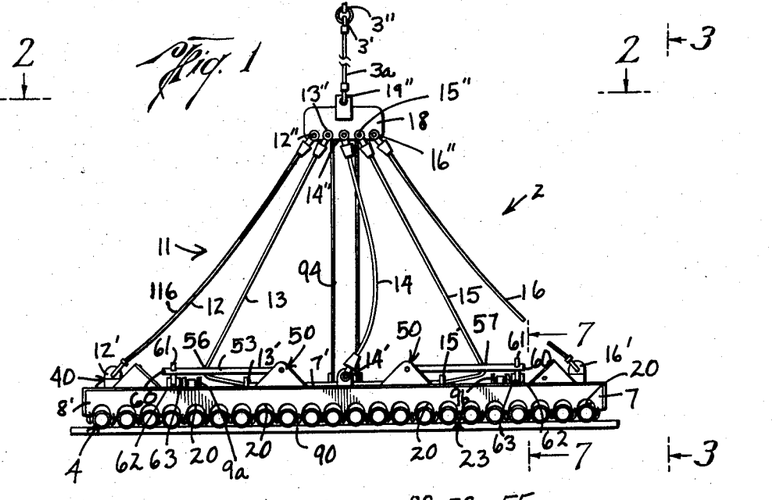
Fig. 1 is a side elevation illustrating an embodiment of the invention with a plurality of tubular members in the tubular receiving portions of the mechanism.

In Fig. 1 the invention is designated generally by the numeral 2 and is shown as being connected by the lifting means 11 to a suitable hoisting cable 3″ which cable is connected to a suitable source of power such as a motor, crane or the like (not shown), whereby the mechanism 2 may be lifted and moved about for positioning relative to the row of stacked tubular members as illustrated generally at 4. After the row 4 of tubular members has been engaged by the mechanism, the power source through the hoisting cable 3″ moves the mechanism 2 and the engaged pipes to another location in the pipe storage yard, or may place them on a vehicle such as a truck for transport to another location.

Figure 3:
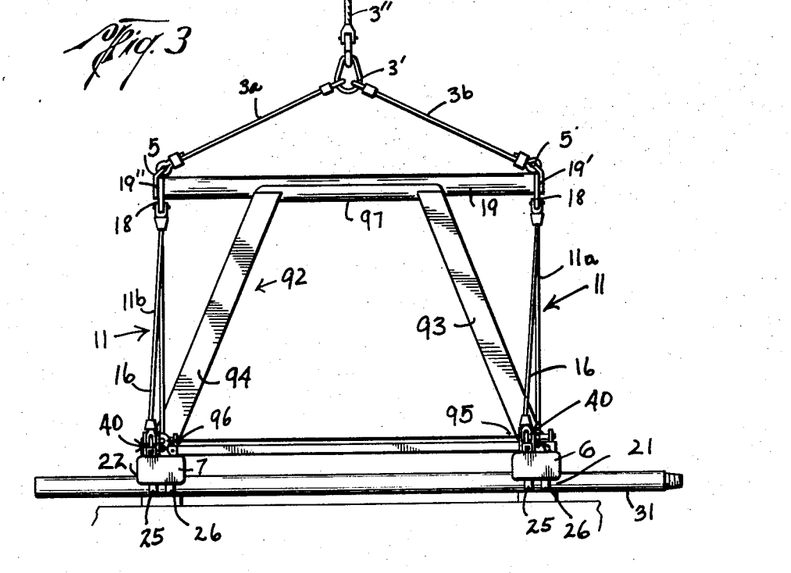
Fig. 3 is an end view of the present invention illustrated in Fig. 1 and further illustrating the relationship of the components of the mechanism with tubular members.

The hoisting cable 3″ is connected to a coupling member 3′, and a yoke formed by the cables 3a and 3b extends downwardly from the coupling 3′ with the ends 5 and 5′ of each of the yoke cables 3a and 3b being connected to ends 19″ and 19′ of the transverse member 19, respectively, as shown in Fig. 3. Plates 18 on each end 19″ and 19′ of member 19 form a common terminal for the upper end of the lifting mechanism, which lifting means is denoted generally by the numeral 11.

The lifting means 11 is shown in the drawings as being in the form of two cable sets 11a and 11b, with each set including the cables 12, 13, 14, 15 and 16 which extend from their connections 12″, 13″, 14″, 15″ and 16″ which extend from their connections 12″, 13″, 14″, 15″ and 16″, respectively, in the plates 18 at each end 19′ and 19″ of member 19 downwardly to the frame members 6 and 7 spaced below the ends 19′ and 19″ respectively. The set 11a of cables 12, 13, 14, 15 and 16 is connected to the frame member 6 and set 11b is connected to the frame member 7. The frame members 6 and 7 are illustrated as being elongated and spaced relative to each other as illustrated at 8 and the cables 12, 13, 14, 15 and 16 of each cable set 11a and 11b is connected at spaced intervals along each of their respective frame members 6 and 7 as indicated at 12′, 13′, 14′, 15′ and 16′, respectively. The frame members 6 and 7 are connected together by laterally extending members 9 and 10 and therefore the hoisting cable 3″ and lifting means 11 moves the frame members 6 and 7 simultaneously. The members 9 and 10 are pivotally connected at 9a and 9b on each of the frame members 6 and 7 to accommodate relative motion therebetween.

It will be noted that each of the members 6 and 7 is provided with a plurality of pipe or tubular member receiving portions 20 which are open towards the bottom or nether portion of each of said members, with the pipe receiving portions of the member 6 being aligned relative to the pipe receiving portions 20 of the member 7. Thus when the members 6 and 7 are positioned over a plurality of pipes at spaced intervals 21 and 22, along their length as shown in Fig. 3. This inhibits tilting of the mechanism 2 as it and the tubular members engaged therein are being lifted, since the pipes are grasped at spaced intervals along the length thereof, and such arrangement also helps to distribute the load more evenly over the pipe loading mechanism 2.

Figures 6, 7, 8:
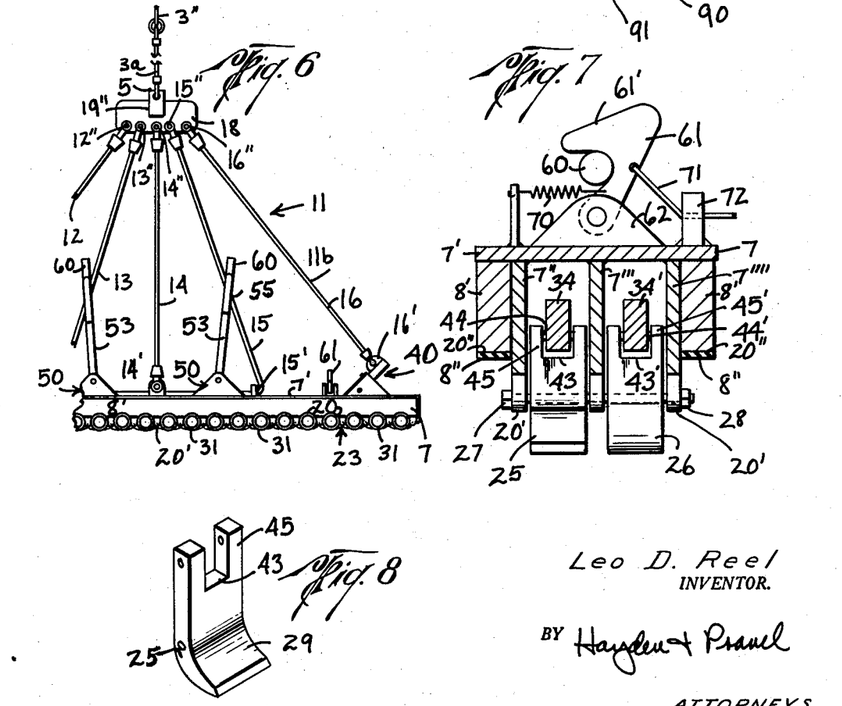

The members 6 and 7 are identical in construction and attention is directed to Fig. 7 for a detailed sectional view of member 7. The member is composed of plate 7′ to which is secured by an suitable means such as welds or the like, the spaced walls 7″, 7‴, and 7⁗. A member 8′ may be secured adjacent each of the outer walls 7″ and 7⁗ to provide additional strength. The walls 7″, 7‴ and 7⁗ are recessed to provide the pipe receiving portions 20. The members 8′ are also recessed to conform with portions 20 and if desired, a suitable covering 8″ may be mounted on the bottom surface 20″ of each of the members 8′ to cushion the contact of the mechanism 2 as it is lowered into engagement with the tubular members.

Adjacent each of the pipe receiving portions 20 in the members 6 and 7 is suitable pipe engaging or gripping means denoted generally at 23 which are pivotally mounted in each of the members 6 and 7 and adapted to engage each of the pipes in each of the pipe receiving portions 20 and hold them in the frame members 6 and 7.

Figure 5:
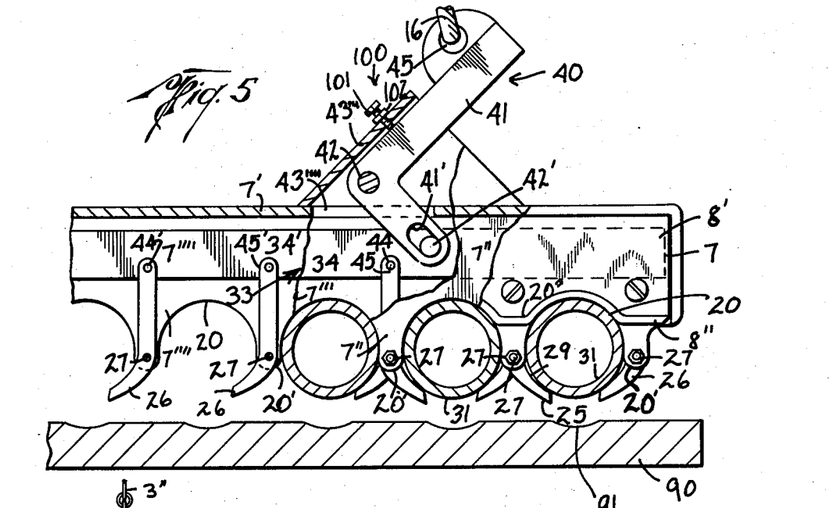
Fig. 5 is a view similar to Fig. 4 but showing the actuating means in actuated position and the relationship of the gripping means to the pipes, or tubular members, in the tubular receiving portions of the frame members.

The means 23 is more clearly illustrated as including oppositely facing projections or depending members, 25 and 26 which are pivotally mounted by any suitable means in the members 6 and 7, and as illustrated are mounted on pins 27 on each side of the pipe receiving portions 20. The pins 27 extend through walls 7″, 7‴ and 7⁗ of the members 6 and 7 and may be secured in position by suitable means such as the bolt 28 threaded on one end of the bolt or pin 27. The oppositely facing members or projections 25 and 26 extend below the bottom surface 20′ of the walls 7″, 7‴, and 7⁗ and are provided with a surface 29, which surface is adapted to conform with the shape of outer periphery 30 of the pipes 31 so as to hold them in the pipe receiving portions 20 of each of the frame members 6 and 7 after the mechanism has been actuated as illustrated in Fig. 5.

The member 25 engages on one side of each of the pipes 31 and the member 26 engages on the other side of each of the pipes 31 to hold them in place.

Means indicated generally at 33 are provided in each of the frame members 6 and 7 for interconnecting the gripping members 23 of each of the frame members 6 and 7 for simultaneous movement so that all of the pipes 31 in the pipe receiving portions 20 of the frame members 6 and 7 may simultaneously be engaged by the means 23 and may simultaneously be released as desired. The means 33 is illustrated in the present invention as being in the form of a pair of bars or rods 34 and 34' which extend longitudinally of each of the members 6 and 7 and in the space between the walls 7" and 7''', 7'''' and 7''''', respectively.

As more clearly illustrated in Fig. 7, the paired connecting rods 34 and 34' are shown with all of the members 25 which face in one direction being secured to one of the connecting rods 34 while the members 26 which face in a direction opposite to the members 25 are connected on the other rod or member 34'.

The projections or members 25 and 26 are each secured to their respective connecting rod 34 and 34' by any suitable means, one form being illustrated in Fig. 7 wherein recessed portions 43 and 43' are provided in the top of each of the members 25 and 26 respectively, which recesses are adapted to receive the connecting rods 34 and 34', respectively, therein. A pin 44 extends through the connecting rod 34 and through each of the arms 45 of the members 25 for pivotally connecting the members 25 to the connecting rod 34. Similarly, a pin 44' extends through the rod 34' and arms 45' of members 26 for pivotally connecting the members 26 to the rod 34'.

Suitable actuating means as denoted generally at 40 are provided for actuating the connecting means 33 in each frame member 6 and 7 for simultaneous movement thereof to effect simultaneous movement of the gripping means 23 in the frame members 6 and 7. It should be further noted that the actuating means 40 is operatively associated and related to the connecting means 33 and to each of the frame members 6 and 7 so that the connecting means 33 in each of the frame members 6 and 7 is actuated simultaneously to effect simultaneous engagement and simultaneous release of the pipe within the pipe receiving portions 20 of each of the frame members 6 and 7. This is accomplished by providing an actuating means 40 for each of the rods 34 and 34' in each of the frame members 6 and 7. It will be noted, as more clearly seen in Fig. 2 of the drawings, that an actuator 40 is provided adjacent each end of each of the frame members 6 and 7 with one actuator connected to rod 34 at one end of the frame members 6 and 7 and another actuator connected to rod 34' at the other end of the frame members 6 and 7, thereby making a total of four actuators for the mechanism.

The actuator means 40 each includes a crank lever 41 which is pivotally mounted on the pin 42 in the support 43''', which support is mounted on plate 7' of the members 6 and 7 over openings 43'''' in the plate 7' of each of frame members 6 and 7. The lever 41 of each actuator is provided with a slot 41' on its inner end.

Each rod 34 and 34' in each of the frame members 6 and 7 is provided with a pin 42', with which the lever 41 may be engaged. Thus, a lever 41 is engaged with each of the four connecting rods for actuation thereof; that is, a lever 41 connects with a pin 42' on the connecting rod 34 and a lever 41 connects with a pin 42' on the connecting rod 34' in the frame member 6 and also a lever 41 connects with a pin 42' on the connecting rod 34, and a lever 41 connects with a pin 42' on the connecting rod 34' of the frame member 7.

It will be further noted that a portion of lifting means 11 is connected to the outer end 45 of each of the levers 41 for actuation of the levers. More particularly, cables 12 and 16 of the cable sets 11a and 11b are illustrated at 12' and 16', respectively, as being connected to the levers 41 on each of frame members 6 and 7. Thus, the lifting means 11, that is the cables 12 and 16 by means of their connection 12' and 16' with the levers 41 of each of the four actuators 40 serve as a means to simultaneously actuate the four connecting means 33 for simultaneously moving the gripping means 23 into engagement with the pipe in the pipe receiving portions 20 of the frame members 6 and 7.

Figure 2:
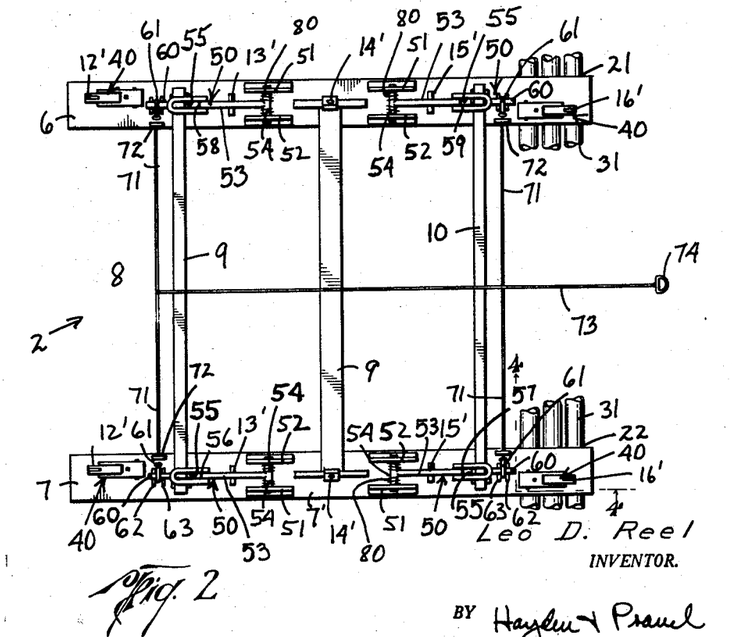
Fig. 2 is a top plan view of the form of the invention shown in Fig. 1 with the hoisting cable, lifting means and cradle omitted from the view and showing in broken section some of the tubular members and their relationship to each other and the mechanism.

However, such actuation to move the gripping means 23 is prevented by reason of the holding or restraining means generally designated by the numeral 50, there being a holding means associated with each of the four actuators 40. It will be noted that two holding means 50 are mounted on the frame member 7 and two holding means 50 are mounted on the frame member 6 and as illustrated in Figs. 1 and 2 of the drawings, assume the form with includes spaced support plates 51 and 52 to which the member 53 is pivotally connected by the cross-bar or shaft 54. Each of the members 53 includes suitable means such as an opening 55 therein through which one of the cables of the lifting means 11 extends. As illustrated at 56 of Fig. 1, the cable 13 of cable set 11b extends through one of the members 53 on frame member 7, and as designated at 58 the cable 13 of the cable set 11a extends through one of the holding members 53 on frame member 6. Similarly, the cable 15 of the cable set 11b of the lifting means 11 extends through the opening 55 of the other member 53 on frame 7 as illustrated at 57 while the cable 15 of the cable set 11a extends through the other member 53 on frame member 6 as designated at 59.

The end 60 of the member 53 is engaged and held by the hook 61 to inhibit movement of the member 53 about its pivotal connection in the plates 51 and 52. It will be noted that the hook 61 is in turn pivotally mounted in the spaced supports 62 and 63 mounted on plate 7', there being a hook 61 provided adjacent the ends 60 of each of the members 53 of the holding means 50 on the member 7 and a hook 61 for each of the ends 60 of the members 53 of the holding means 50 mounted on the member 6.

This construction normally holds the members 53 in substantially horizontal relationship relative to the frame members 6 and 7 upon which they are mounted as illustrated by Fig. 1. Since the cables 13 and 15 of the lifting means 11 are connected through the openings 55 of the arms 53, this foreshortens the cables 13 and 15 of each cable set 11a and 11b so that the cables 12 and 16 of each cable set 11a and 11b that are connected to the actuators 40 are slack, thereby inhibiting movement of the four actuators 40 until a predetermined time.

The construction and arrangement of the hook 61 is more clearly illustrated in Fig. 7 and as previously mentioned, it is pivotally mounted between the supports 62 and 63 that are in turn secured on plate 7'. A spring 70 normally tends to urge the hook 61 to engagement with the member 53 to inhibit premature disengagement therebetween. A cable 71 is connected to the hook 61 and extends through guide 72, there being a guide 72 mounted adjacent each of the hooks 61 on frame members 6 and 7, whereby the cable 71 may be moved to exert a force against the spring 70 so as to release the hook 61 from engagement with the member 53. As more clearly illustrated in Fig. 2, the cables 71 to each of the four hooks 61 are connected to a common line 73 which is provided with a handle 74 thereon whereby all of the hooks 61 may be actuated simultaneously so as to simultaneously release each of the members 53 from engagement with the hook 61 there adjacent.

When this occurs, each of the four members 53 will be moved upwardly by the cables 13 and 15 of the lifting means 11 and about their pivots in the support plates 51 and 52. This serves to take up the slack in the members 12 and 16 of the lifting means 11, thereby exerting a simultaneous pull on each of the actuators 40 which causes the connecting rods 34 and 34' to move simultaneously and longitudinally of each of their frame members 6 and 7, respectively, thereby urging the gripping means 23 into simultaneous engagement with the pipe 31 as shown in Fig. 5 of the drawings.

It will be noted that after the device 2 has been actuated, the lifting means 11 cooperates with the actuators 40 so as to hold the gripping means 23 in engagement with the tubular members 31 in the pipe receiving portions 20 of the frame members 6 and 7 during lifting and movement of the mechanism 2. Similarly, the lifting means 11 cooperates with, and maintains the holding means 50 in a position so as to maintain the gripping means 23 in an activated position, while the mechanism moves the engaged tubular members 31 about the storage yard, or onto a transport vehicle, as desired.

After the device 2 has been positioned on the tubular members 31 and actuated to engage them, and after the tubular members 31 have been loaded on a vehicle or to any other desired location, it is then necessary to effect release of the gripping means 23 from the tubular members 31 engaged within the pipe recesses 20 so that the mechanism 2 may be free to engage another load of pipe or tubular members. This may be accomplished by cooperation between the lifting means 11 with the construction and arrangement of the holding means 50. For example, it will be noted from the illustration in Fig. 6 that the members 53 of the holding means 50, even in elevated, or released position, are related to their pivot points in plates 51 and 52 so that their weight will normally tend to urge them back to their original or contained position relative to frame members 6 and 7 as shown in Fig. 1.

Therefore, when the mechanism or device 2 is lowered by the hoisting cable 3″ so that the weight of pipes 31 is taken off the device 2, that is when the pipes have been lowered to rest on a truck bed or rack in the storage yard, continued lowering of member 19 by hoisting cable 3″ induces slack in the lifting means 11. This, along with the weight of members 53 and their relationship to their pivot, causes the member 53 to fall back down on each of the frame members 6 and 7, whereupon they hit against the sloping top 61′ of hooks 61 and spring the hooks 61 open to engage therewith. However, if desired, additional means such as the springs 80 may be provided which are engaged about the cross-shaft 54 and are adapted to urge the member 53 towards seating position with the hook means 61. Naturally, the weight of the tubular members engaged in the mechanism, inhibit movement of the members 53 from their position illustrated in Fig. 6 until after the mechanism and the tubular members held thereby are lowered onto a vehicle so as to take the weight off the lifting means 11. Thereupon, the hoisting cable 3″ may be lowered so as to lower lifting means 11, so that the members 53 may fall and become engaged with the hook means 61 whereby the actuators 40 are not acted upon the cables 12 and 16 of the lifting means, thereby releasing the actuators 40 from urging the rods 34, 34′ with which they are engaged longitudinally of the frame members 6 and 7.

The hoisting cable 3″ may be then raised whereupon the weight of the pipes 31 acting against members 25 and 26 spread them so that the tubular members 31 are released from frame members 6 and 7 as the mechanism is raised by the hoisting cable 3″.

While it is believed that the operation of the invention is apparent by reason of the foregoing description, to further amplify and describe, it will be described in loading tubular members such as drill pipe which are used in the drilling of oil, gas and water wells. Normally such pipe is stored on racks in a storage yard until they are needed at a drilling location. As previously mentioned, heretofore it has been customary to manually load such pipe from the rack in the storage yard onto a vehicle whereupon they are transported to the drilling site.

However, with the present invention, such pipe may be quickly and easily loaded with a minimum of effort and expense. The hoisting cable 3″, as previously mentioned, may be connected to a crane, motor, or to a truck mounted with a suitable frame for supporting the mechanism 2 on the end of the hoisting cable 3″. Initially, the mechanism and its components will assume the position illustrated in Fig. 1 wherein the lifting means 11 is related to the member 19, to the hoisting cable 3″, and to the frame members 6 and 7 so that the cables 13 and 15 of each cable set 11a and 11b are taut and carry the load of the mechanism 2. The cables 12 and 16 of each cable set 11a and 11b are slack so that no force is exerted on the actuators 40. Therefore, the gripping means 23 will assume the position as illustrated in Fig. 4 in relation to each of the tubular pipe receiving portions 20 of each of the frame members 6 and 7.

The mechanism is positioned over the rack of pipe in the storage yard and the hoisting cable lowered so that the members 31 are received between the open, or spread, depending projections 25 and 26 and into the pipe receiving portions 20 of each of the frame members 6 and 7. Of course, it is desirable that the mechanism 2 be positioned relative to the ends of the pipe members 31 with which they are to be engaged so that the weight of the pipe members on each of the frame members 6 and 7 is balanced. This inhibits tilting of the mechanism 2 during movement raising and lowering of the engaged tubular pipe sections. If desired, the mechanism 2 may be guided manually down into engagement with the tubular members 31 as the hoisting cable 3″ lowers the mechanism 2.

Figure 4:
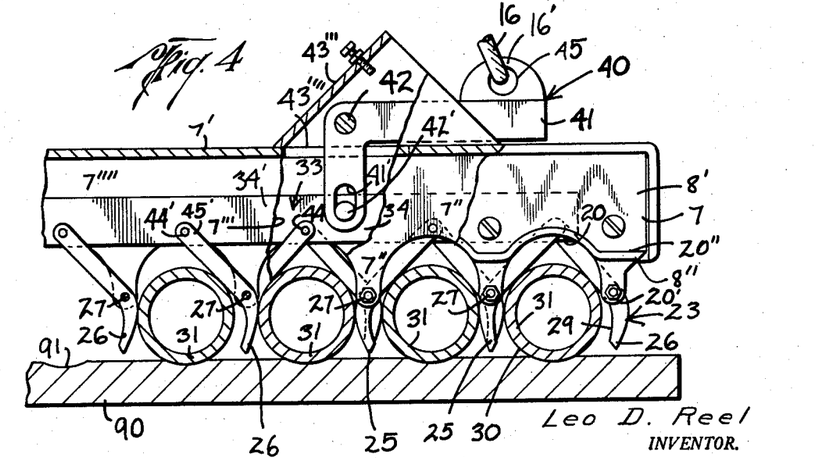
Fig. 4 is a sectional view on the line 4—4 of Fig. 2 through a portion of one of the frame members showing in enlarged detail the structural arrangement of the actuating means and its relationship to the connecting means which operates the pipe gripping means for engaging the pipe in the pipe receiving portions of the frame members.

When the tubular pipes 31 are engaged in the mechanism as shown in Fig. 4 of the drawing, the handle 74 may be grasped so as to release the hooks 61 from engagement with the ends 60 of the members 53 of the holding means 50. The tension in cables 13 and 15 thereupon causes the members 53 to move upwardly, and if necessary a slight upward movement on the hoisting cable 3″ may be used so as to tighten all of the cables 12, 13, 14, 15 and 16 of each cable set 11a and 11b of the lifting means 11.

It is to be noted at this point that the hoisting cable 3″ is related to the member 19, and the member 19 is in turn connected to each cable set 11a and 11b of the lifting means 11 so as to exert a simultaneous lifting and lowering movement on the lifting means 11.

After all of the cables 12, 13, 14, 15 and 16 have been tightened, or at least as they are being tightened, the cables 12 and 16 operate the actuators 40. As previously described, the cables 12 and 16 of each cable set 11a and 11b are connected at 45 to the crank lever 41 of the actuator 40. When the cables 12 and 16 are tightened, the crank lever 41 is moved about the pivot 42 as illustrated in Fig. 4 in its initial position, to the actuated position illustrated in Fig. 5 of the drawings. Movement of the crank lever 41 about the pivot 42 urges each of the connecting rods 34 and 34′ in each of the frame members 6 and 7 longitudinally thereof. As previously discussed, one actuator 40 is connected with each of the rods 34 or 34′ in each of the frame members 6 and 7.

It is to be further noted that the connecting means of each frame member, which consists of the rod 34 and the rod 34′, interconnects the downward projections 25 and 26 of the gripping means 23 so that all of the projections 25 are moved simultaneously by movement of the rod 34, and similarly, all of the projections 26 are moved simultaneously by movement of the rod 34′ by its actuator. This simultaneous movement of the members 25 and 26 as the device is actuated causes them to engage about the tubular members 31 and to hold such tubular members 31 in the pipe receiving portions 20 of the frame members 6 and 7.

Since the cables 12 and 16 are taut during raising and moving of the engaged tubular members 31, the actuators 40 hold the respective rods with which they are connected in a position so that the gripping means 23 is maintained in actuated or closed position.

This prevents premature release of the pipe and injury to any workmen thereby.

After the engaged pipe has been moved to the desired location in the storage yard where it is to be stacked, or if the pipe is to be loaded on a vehicle, after it has been lowered onto the truck bed, it then becomes necessary to release the mechanism 2 from the engaged pipe, so that such mechanism may be used to load another stack of pipe on the vehicle or about the storage yard.

The holding means 50, by reason of its relationship to the lifting means 11 and in cooperation with the lifting means 11, operate to allow the gripping means 23 to be moved to an open position for discharging the tubular members 31 from the pipe receiving portions 20 after the device 2 has been lowered onto the truck bed to deposit the pipes 31 thereon.

As previously mentioned herein, the release of the holding means 50 is simultaneous so that the movement of the actuators 40 is in turn simultaneous to engage the pipes 31 in the device 2, and in turn the movement of the connecting means 33 is simultaneous to effect simultaneous release of the gripping means 23.

After the device 2 has moved the engaged tubular members to the desired location, the hoisting cable 3″ lowers the mechanism 2, and after the pipes are set on the truck bed, or on the rack if they are being placed in the storage yard, the weight is thereby taken off the lifting means 11. Continued lowering of the hoisting cable 3″ permits the members 53 to return to their original position seated within the hooks 61. As previously pointed out, the construction and arrangement of the members 53 and their relationship to their pivots is such that after the weight has been taken off the lifting means 11, they will automatically seat within the hook 61. Additionally, springs 80 may be used, if desired, to provide additional force for urging the members 53 back to their seating position. When the members 53 are seated within the hooks 61, this places the weight of the mechanism 2 on the cables 13 and 15 of each cable set 11a and 11b, and in turn causes slack in the cables 12 and 16 which are connected to the actuators 40.

Thereupon the hoisting cable 3″ may lift the mechanism 2 and because of the slack in cables 12 and 16, the actuators 40 may be permitted to return to their original position as illustrated in Fig. 4 of the drawings. The weight of the tubular members 31 acting upon the depending projections 25 and 26 spreads the projections as the mechanism 2 is lifted so that the members 31 may move out of engagement therewith.

This automatically positions the members 25 and 26 in open position to receive a new load of pipe when the mechanism is lowered into engagement with such load.

If desired, a receptacle 90 may be provided having notches or grooves 91 therein as best illustrated in Fig. 5 of the drawings for receiving and stacking the tubular members 31 either in a storage yard or on the body of a vehicle.

Additionally, in order to prevent entanglement of the cable sets 11a and 11b, a cradle designated generally by the numeral 92 may be used, such cradle including the portions 93 and 94 which are secured at their lower ends 95 and 96, respectively, to the frame members 6 and 7 and extend upwardly therefrom and are inclined relative to each other with a connecting portion 97 conformed to receive the member 19. The connecting portion 97 of the cradle 92 is positioned above the frame members 6 and 7 so as to permit sufficient lowering of the lifting means 11 to accomplish the functions hereinbefore described, while inhibiting entanglement of the cables 12, 13, 14, 15 and 16 with each other or with the cables of either cable set 11a and 11b.

It is to be noted that the mechanism is constructed and arranged so that it is adapted to pick up a plurality of stacked tubular members or pipes 31, which members are generally stacked side by side as illustrated in the drawings. Additionally, the mechanism discharges the tubular members onto a truck body or vehicle in a side by side relation for easy removal from the vehicle at the drilling location or other desired location.

Suitable means as illustrated at 100 is mounted in the housing 43 for adjusting the amount or length of travel of the crank lever 41. This controls the amount of travel of the rods 34 and 34′, which in turn controls the amount of movement of the members 25 and 26. Where the tubular members 31 are smaller in diameter, it may be desired to have more travel of the rods 34 and 34′ to in turn move the projections 25 and 26 closer together so as to be sure that the members 25 and 26 are close enough together in actuated position to prevent loss of the smaller diameter pipe 31 between the space at the ends of the members 25 and 26. The means 100 is shown as including a bolt 101 which may be adjusted and locked by means of the lock nut 102 as to regulate the travel of crank lever 41.

Figure 9:
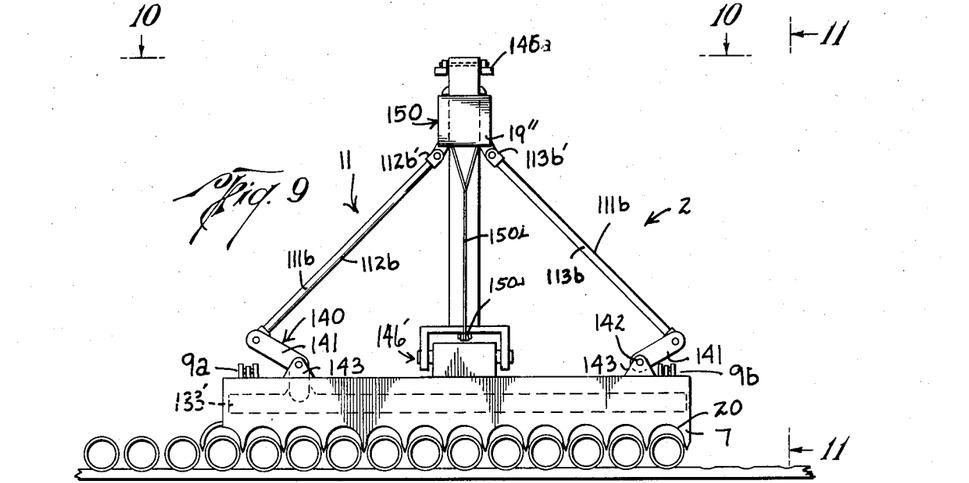
Fig. 9 is a side elevation of another embodiment of the invention with a plurality of tubular members in the tubular receiving portions of the mechanism.

In Fig. 9 a modification of the invention 2 is illustrated. The modification of Fig. 9 includes a lifting means 11 which is similar in function to the lifting means 11 of the Fig. 1 modification. Also spaced frame members 6 and 7 are provided and are connected together by laterally extending members 9 and 10 which members are pivotally connected at 9a and 9b on the members 6 and 7 as described with regard to Fig. 1.

Additionally a transverse member 19 is provided in the Fig. 9 modification which is adapted to be secured to a hoisting cable 3″ (not shown in Fig. 9), and which transverse member is in turn connected with the frame members 6 and 7 by means of the lifting means 11 and posts 145 and 146 so that when the hoisting cable is raised or lowered, the device 2 is raised or lowered. The transverse member 19 is provided with an eye 19a whereby the hoisting cable 3″ may be secured to the member 19. The lifting means of the Fig. 1 modification include the cable sets 11a and 11b, whereas the lifting means 11 of the Fig. 9 modification have eliminated the cable and have substituted therefor the two sets of rods of 111a and 111b with each rod set including the individual rods 112a, 113a, and 112b, 113b respectively. Each of the rods is pivotally connected to the transverse member 19, with the rods 112b and 113b of the rods set 111b being pivotally connected to the end 19″ of the member 19 by any suitable means such as the pivotal connection illustrated at 112b′ and 113b′ respectively. The rods 112a′ and 113a′ of the rods set 111a are pivotally secured to the other end 19′ of the transverse member 19 in a similar fashion.

The lower ends of the rods 112a, 113a, 112b, and 113b are secured to the actuator means 140, which actuator means is supported on each of the frame members 6 and 7.

Of course each of the frame members 6 and 7 are provided with pipe receiving portions 20 arranged as described with regard to the Fig. 1 modification so that pipe or tubular stock may be received therein. Adjacent each of the pipe receiving portion 20 in the members 6 and 7 is suitable pipe engaging or gripping means denoted generally by the numeral 123, which gripping means are pivotally mounted in the connecting rod 133′ which rod comprises the connecting means 133. It will be noted that in the Fig. 9 modification one connecting rod, 133′, is illustrated, whereas in the Fig. 1 modification the invention is there described wherein two connecting rods 34 and 34′ are illustrated. The function of the actuator means, 140, and connecting rod 133′ is similar to the actuator means 40 and rods 34 and 34′ of the Fig. 1 modification.

The means 123 includes the links 123a each of which is pivotally connected as illustrated 123b at its upper end to the connecting rod 133′ and is pivotally connected as illustrated at 123c to the guide element 123d. The guide element 123d is secured to the curved surface 123e which surface forms oppositely facing projections or depending members 125 and 126 which are adapted to engage on each side of the pipes 31 and thereby hold the pipe in place in the pipe receiving portion 20 of the device 2 when it has been actuated.

Figures 12, 13, 14:
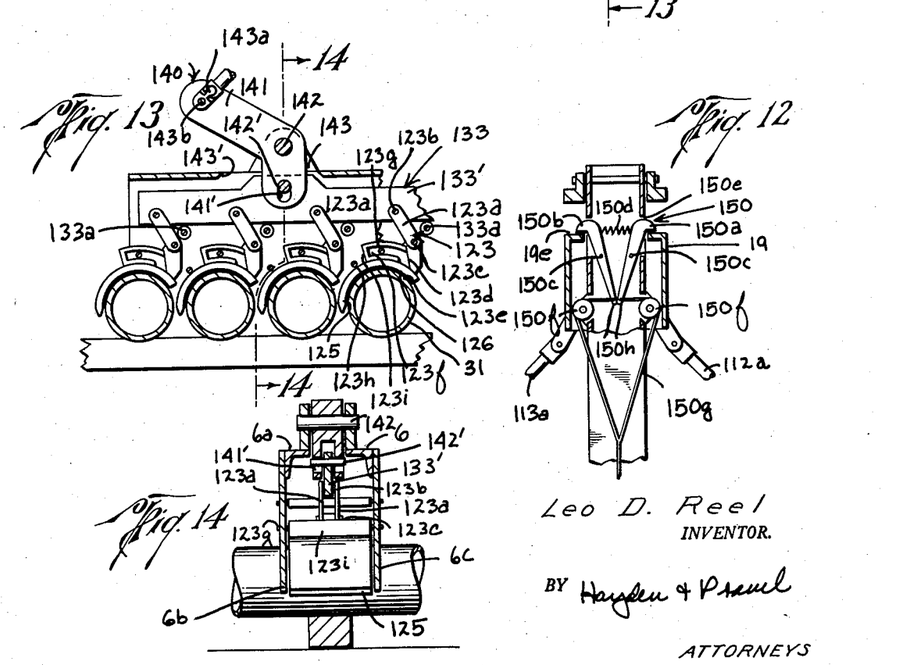
Fig. 12 is a sectional view on line 12—12 of Fig. 11 and illustrates the form of restraining means which may be used with the modification shown in Figs. 9–14 inclusive.
Fig. 13 is a sectional view on line 13—13 of Fig. 11 illustrating further structural details of a means for gripping the pipe when the device of Figs. 9–19 is lowered to operative position thereon.
Fig. 14 is a sectional view on line 14—14 of Fig. 13, partly in elevation and showing additional structural details of the gripping means.
Figure 18:
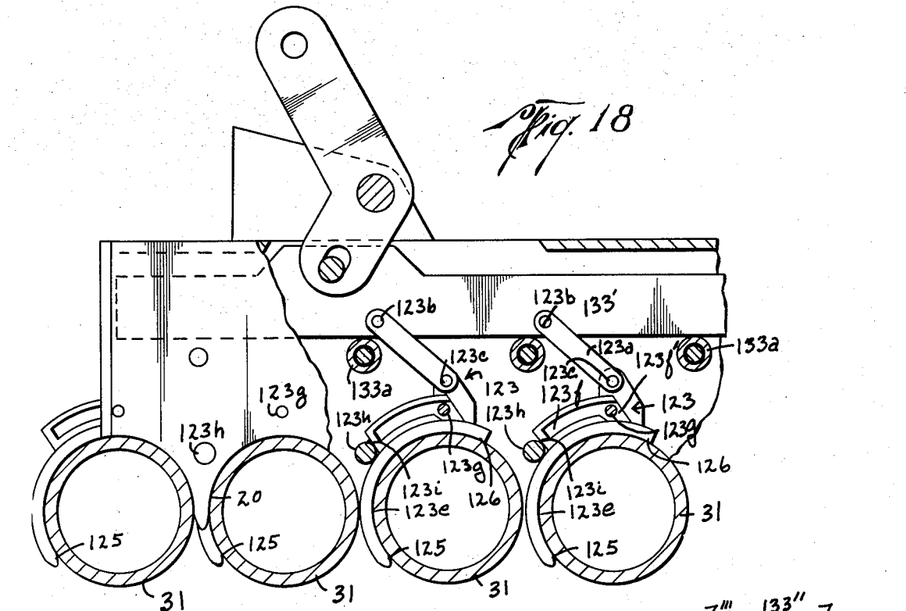
Fig. 18 is an enlarged sectional view on the line 18—18 of Fig. 17 showing in more detail the structural arrangement of the gripping means.

The guide 123d is shaped as illustrated in Figs. 13 and 18 of the drawing whereby a guide slot 123f is formed. A pin is secured in the frame members 6 and 7 as illustrated at 123g and is adapted to move in the guide slot 123f of each guide when the lever 141 of the actuator 140 is moved. Such movement causes the rod 133' in each frame member 6 and 7 to travel longitudinally thereof to engage the gripping means 123 with the pipe 31. An additional pin 123h is disposed adjacent each of the pipe gripping means 123 so as to abut rear surface 123i of the guide 123d to limit the movement thereof and to tilt it to bind each of the means 123 with each pipe 31.

The means 133 which interconnects each of the pipe gripping means 123 is illustrated in Fig. 9 and as previously mentioned in the Fig. 9 modification only one interconnecting means is shown whereas in the Fig. 1 modification two connecting rods were provided in each frame member 6 and 7.

In order to support the rod 133' in each of the frame members 6 and 7 suitable means such as the roller bearings 133a may be provided which are mounted in the frame members 6 and 7 at spaced intervals to effect the desired movement of the rod 133' when the lever 141 is moved.

In addition to crank lever 141 the actuator 140 includes the support 143 which is mounted on each of the frame members 6 and 7 adjacent the end thereof. A pin 142 extending through the support pivotally mounts the crank lever 141 in such support. As illustrated in Fig. 9, it will be noted that only one of the crank levers is connected with the connecting means 133 in each frame member 6 and in frame member 7. Therefore an opening 143' is provided in each of the frame members 6 and 7 adjacent that crank lever 141 which is adapted to extend into the frame member so as to be engaged with the interconnecting rod 133'. A slot 141' is provided on the inner end of the crank lever which is engaged with the rod 133' so that the crank lever 141 is thereby connected by means of the pin 142' to the rod 133'.

Attention is directed to Fig. 13 of the drawing wherein the manner of connecting each of the rods 112a, 113a, and 112b, 113b, with its respective lever 141 is illustrated. It will be noted that such manner of connection includes the universal joint arrangement 143a as well as the pivot connection 143b, whereby relative movement or motion may occur in both the horizontal and vertical plane between the frame members 6 and 7 and the lifting means 11.

Additionally it will be noted that posts 145 and 146 are pivotally secured as illustrated at 146' to each of the members 6 and 7 and extend upwardly therefrom. The transverse member 19 is provided with openings 19c and 19d which are adapted to telescopically receive the posts 145 and 146 respectively. Since a portion of the lifting means, that is the rods 112a and 112b are connected to operative crank levers 141 mounted on each of the frame members 6 and 7 as previously described, the lifting means 11 serves as a means to simultaneously actuate the two connecting means 133 in each of the frame members 6 and 7 for simultaneously moving the pipe or member gripping means 123 into engagement with the pipes in the pipe receiving portion 20 of frame members 6 and 7. However, as previously described with regard to the Fig. 1 modification, such actuation to move the gripping means 123 is prevented by reason of the holding or restraining means generally designated by the numeral 150, there being a holding means, or restraining means, associated with each of the rods 112a and 112b.

In the Fig. 9 modification the restraining means 150 is illustrated in more detail in Fig. 12 and includes the paired prongs 150a and 150b which paired prongs are pivotally mounted as illustrated at 150c in each of the posts 145 and 146. A spring 150d urges the prongs 150a and 150b outwardly through the opening 150e in each of the posts 145 and 146 so that such prongs engage the top surface 19e of the member 19. Thus when the restraining means 150 is in the position illustrated in Fig. 12 of the drawing, movement of the member 19 relative to the posts 145 and 146 is normally prevented and such movement will be prevented until the prongs 150a and 150b are released from the engagement with top 19e of the member 19.

Figure 10:
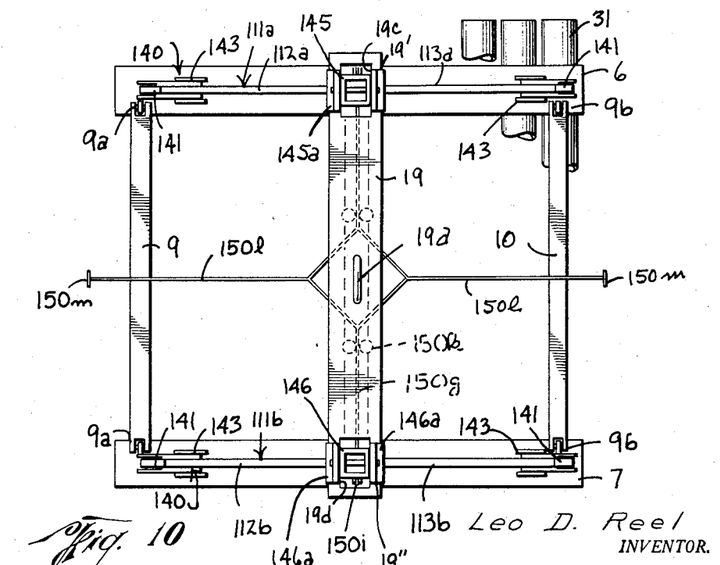
Fig. 10 is a top plan view of the Fig. 9 modification and showing in broken section some of the tubular members and their relationship to each other and the mechanism.
Figure 11:
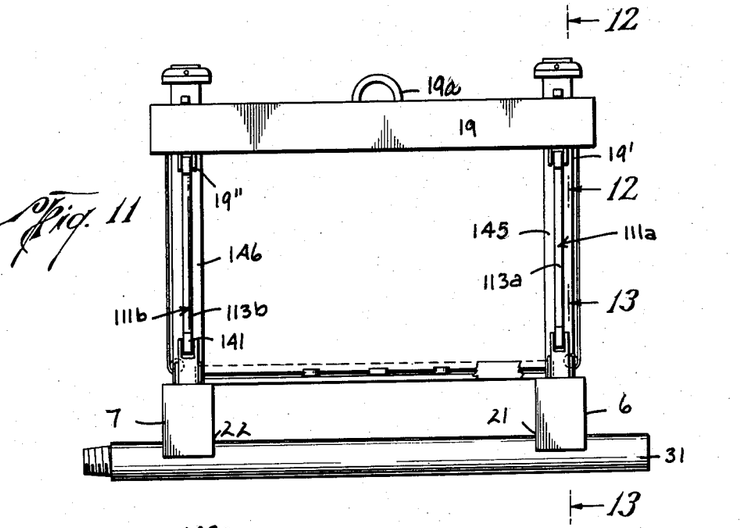
Fig. 11 is an end view of the Fig. 9 modification and further illustrating the relationship of the components of such modification with the members engaged thereby.

The restraining means includes the pulleys 150f which receive the cables 150g that are connected at their upper ends to the lower ends of each of the prongs 150a and 150b as illustrated at 150h. The cables 150g extend downwardly along each of the posts as illustrated at 150i, and pass over the pulley 150j adjacent the lower end of each of the posts and extend inwardly toward the middle of the device as illustrated in Fig. 10 of the drawing.

If desired, a suitable guide pulley 150k may be provided for guiding the cable 150g. Suitable extensions 150l are provided on each of the cables 150g and extend forwardly and rearwardly of the device as shown in Fig. 10 so that by grasping the handle 150m on either of the extensions 150l, the cables 150g may be pulled so as to pivot the prongs 150a and 150b inwardly toward each other through opening 150e so as to disengage them relative to the surface 19e of member 19.

When the prongs of 150a and 150b have been thus retracted, the transverse member 19 may move upwardly along each of the posts 145 and 146 when the hoisting cable 3" (not shown) is actuated so as to in turn cause the rods 112a and 112b to pivot the crank levers 141 about their pivot pins 142 to actuate the rods 133' in each of the members 6 and 7 which in turn causes each pipe engaging means to simultaneously engage the pipe 31.

Thus when a plurality of pipes are to be engaged in the device, the apparatus will normally assume the position illustrated in Fig. 9 and be lowered in pipe receiving position. The restraining means 150 holds the pipe engaging means 123 from engagement with the pipe and the device may be lowered so as to seat on the pipe as illustrated in Fig. 9, whereupon the cable extension 150l may be pulled so as to release the prongs 150a and 150b and simultaneous lifting of the device causes the rod 133' to move in the member 6 and the rod in member 7 to move simultaneously to thereby actuate each of the piping engaging means 123. Thus when the device 2 is lifted, and the restraining means 150 released, the device will automatically engage the pipes and hold them in engaged position as it moves the pipes about. A stop 145a and 146a is provided on each of the posts 145 and 146 to limit upward movement of transverse member 19 therealong.

After the tubular members 31 engaged in device 2 have been loaded on a vehicle or moved about as desired, it is then necessary to effect release of the gripping means 123 from each of the tubular members 31 engaged within the pipe recesses 20. When the device is set down, the weight of transverse member 19 causes it to move downwardly along each of the posts 145 and 146 so as to urge rods 112a and 112b connected therewith in an opposite direction from their original movement so as to in turn move the rod 133' in each of frame members 6 and 7 toward their initial position which also moves each of the pipe gripping means 123 to initial inactive position. The member 19 will move downwardly along each of the posts 145 and 146 until the crank lever 141 contacts the top of each of frame members 6 and 7. When this occurs the prongs 150a and 150b will be urged outwardly of opening 150e in each of the posts 145 and 146 so as to again engage the top surface 19e of member 19 and thereby hold or restrain means 123 in inactive position. The device 2 may be then lifted off the pipes and moved to position so as to engage a new group or set of tubular members therein.

Figure 15:
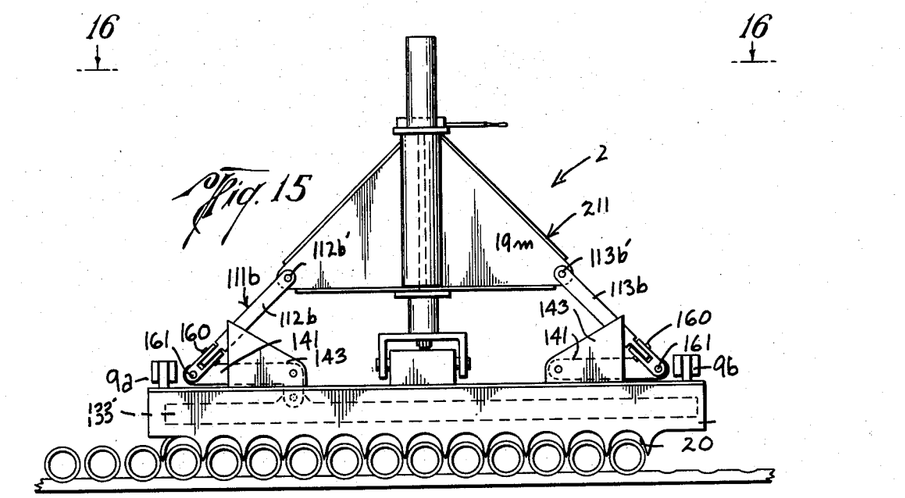
Fig. 15 is a side elevation of still another embodiment of the invention.
Figure 16:
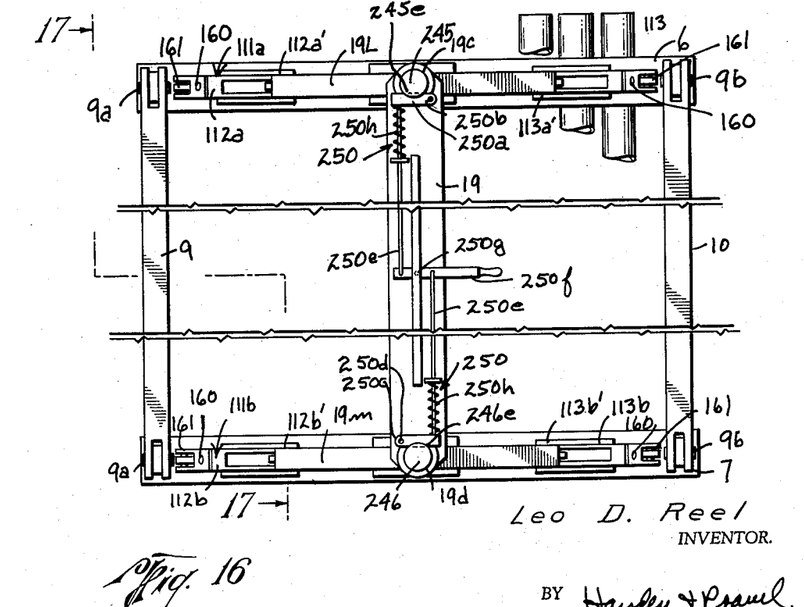
Fig. 16 is a broken top plan view of the Fig. 15 modification.

In Fig. 15 the modification there illustrated in indicated generally by the numeral 2, and the lifting means is indicated by the numeral 211, frame members are illustrated at 6 and 7 in Fig. 16 with members 9 and 10 extending therebetween and secured pivotally thereto as illustrated at 9a and 9b respectively. Each of the frame members 6 and 7 are provided with pipe receiving portions 20 as previously discussed with regard to the other modifications. A single interconnecting rod 133' is provided in each of the frame members 6 and 7 as described with regard to the Figure 9 modification.

Figure 17:
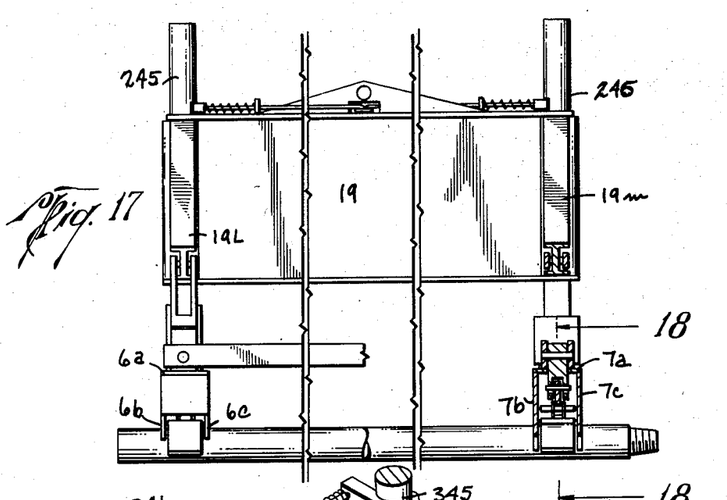
Fig. 17 is a broken end view, partly in section on the line 17—17 of Fig. 16.

The pipe engaging means 123 is more clearly shown in Fig. 18 and is shown as being similar to that previously described with regard to the Fig. 9 modification. Additionally, posts or vertically extending support means 245 and 246 are pivotally mounted on each of the frame members 6 and 7 respectively and extend upwardly therefrom. As noted in Fig. 17 the member 19 is somewhat wider and is provided with openings 19c and 19d for telescopically receiving each of the posts 245 and 246, and a triangular portion 19l and 19m is illustrated at each end of the transverse member 19.

The set of rods 111a and 111b as illustrated in Fig. 16 is somewhat shorter than previously described with regard to Fig. 9 but each set includes the rods 112a and 113a and the rods 112b and 113b respectively. Such rods are pivotally connected at their upper ends to the plates 19l and 19n as illustrated at 112a', 113a', 112b' and 113b', respectively. The pivot connection as indicated at 160 in each of such rods accommodates lateral movements, and they are pivotally connected as illustrated at 161 at their lower end to the crank lever 141. The crank levers 141 are pivotally mounted in the supports 143 as previously described with regard to the Fig. 9 modification.

The restraining or holding means is illustrated generally by the numeral 250 and includes the pin 250a which is pivotally mounted, as illustrated at 250b on the member 19 and the member 250c which is pivotally mounted as illustrated at 250d on the member 19. Each of the members 250a and 250c are disposed adjacent the posts 245 and 246 respectively and are adapted to engage in grooves 245e and 246e of posts 245 and 246 respectively. Rods 250e are pivotally connected with the members 250a and 250c respectively and are in turn connected to the lever 250f which lever is pivotally mounted at 250g on the top of the member 19. Springs 250h are mounted on the rods 250e so as to continually urge each of the members 250a and 250c into the grooves 245e and 246e respectively.

The function and operation of the form of the invention illustrated in Figs. 15 and 16 is similar to that previously described with regard to Fig. 9 modification. The restraining means 250 holds the pipe engaging or gripping means 123 in retracted position until the lever 250f is moved so as to release the members 250a and 250c from the engagement with the posts 245 and 246 respectively. Simultaneous lifting of the member 19 and device 2 by the hoisting cable 3'' (not shown) moves the member 19 along the posts 245 and 246. This causes the rods 112a and 112b to actuate each of the crank levers 141 so as to move the interconnecting rods 133 to operate the pipe engaging means 123 connected therewith. If desired suitable stops can be arranged on the top of each of the posts as previously described with regard to the Fig. 9 modification.

Particularly attention is directed to Fig. 18 wherein pipe engaging means 123 is illustrated in its actuated position and it will be noted that the guide slot 123f terminates in the downwardly extending portion as shown at 123f' When the rod 133' moves longitudinally of each of the frame members 6 and 7 on the roller bearings 133a, the pin 123g moves along the guide slot 123f and when the guide 123d abuts the pin 123h, the pin 123g will be urged into the downwardly extending portion 123f' of guide slot 123f. The arrangement of pin 123g is such that such action will cause the curved surface 123e to cock slightly, or will cause the surface 123e to bind against its adjacent pipe 31 which aids in locking each of the pipes 31 in engagement with the pipe engaging means 123.

As previously noted the modification of the invention described herein, as well as the modification illustrated in Fig. 9 include only one interconnecting or connection rod 133' and therefore the frame members 6 and 7 will assume a generally U-shaped configuration as illustrated in Fig. 14 which includes the base 6a of the U and the depending portions 6b and 6c. The frame member 7 will be similarly constructed.

Figure 19:
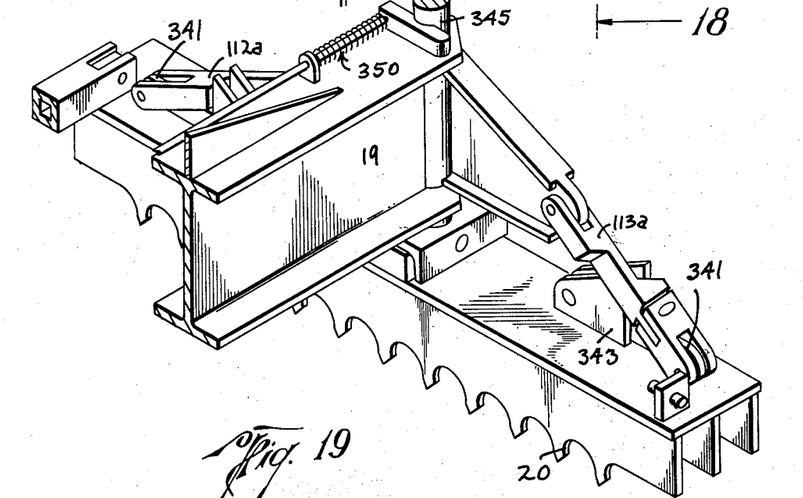
Fig. 19 is a partial isometric view of the Fig. 15 embodiment illustrating a further modification wherein two connecting rods are provided for actuating the gripping means illustrated in Figs. 20 and 21.
Figures 20, 21:
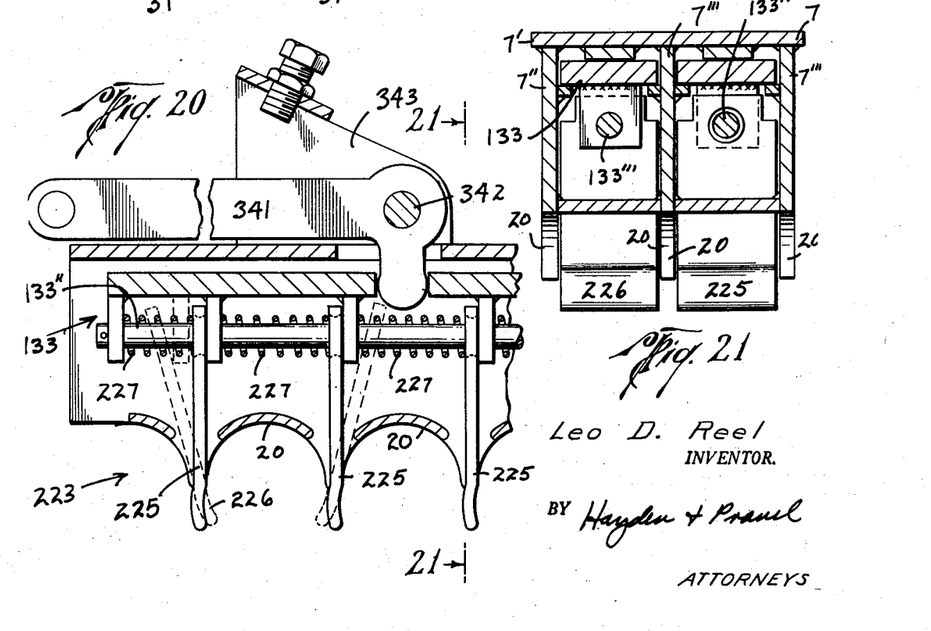
Fig. 20 is a sectional view similar to Figs. 4, 13, and 18 in that it shows an alternate form of gripping means.
Fig. 21 is a sectional view partly in elevation on the line 21—21 of Fig. 20.

In Figs. 19, 20, and 21 a form of the invention is illustrated wherein the connecting means includes two connecting rods 133'' and 133''' which two rods are provided in each of the frame members 6 and 7. The rods 133'' and 133''' are similar in function to rods 34 and 34' of the Fig. 1 modification. Each of the frame members 6 and 7 will therefore be provided with a top plate 7' as illustrated in Fig. 1 and walls 7'', 7''', 7'''' secured to the top wall or upper plate by any suitable means such as welds or the like. The operation of the invention will be similar to that described generally with regard to the form illustrated in Figs. 1, 9 and 15, however, it is to be noted that the rods 112a, 113a, 112b and 113b are all connected to operative crank levers 341, and each crank lever is connected to a connecting rod. There are two crank levers on each frame members 6 and 7 as described with regard to Fig. 1 modification and of course, there are two connecting members in each frame member therefore making a total of four active actuators. An alternative form of pipe engaging means 223 is indicated generally in Fig. 20, and it will be noted that such means is connected with the interconnecting means 133, which is shown in the Figs. 20 and 21 modification as comprising the rods 133'' and 133'''. The crank lever 341 is mounted in the support 343 by means of the pivot pin 342 and engages with its respective interconnecting rod means in each of the frame members 6 and 7.

The pipe engaging means 223 is illustrated as including depending projections 225 which are mounted on one of the interconnecting rods 133'' adjacent the pipe receiving portions 20. Oppositely facing depending projections 226 are shown in dotted line in Fig. 20 which are mounted on the adjacent interconnecting rod 133''' and adjacent each pipe receiving portion 20. Additionally springs 227 are supported on the rods 133'' and 133''' in any suitable manner such as that illustrated in the drawing so that such springs can maintain the depending projection 225 and 226 on each of the rods in a spaced apart vertical relationship.

When the restaining means as illustrated generally at 350 has been released, the member 19 will move upwardly along each of the posts 345 and 346 and pull each set of rods 111a and 111b upwardly. The restraining means 350 is similar to restraining means 250. Since each rod is connected with an operative crank lever 341 which lever is in turn connected with one of the interconnecting rods 133'', 133''' in each of the frame members 6 and 7, the interconnecting rods are moved longitudinally of their respective frame members 6 and 7 thereby urging the gripping means 223 into simultaneous engagement with the pipes as illustrated in Fig. 20 of the drawings.

The downward depending projections 225 and 226 are suitably conformed at their lower end so that when they are moved toward each other they will tend to hold the pipe in position therebetween as shown in dotted line in Fig. 20. In this connection this should be noted that the operation of the form of the gripping means illustrated in Figs. 20 and 21 is similar to that described with regard to Fig. 4. The means 133 of the Fig. 20 modification includes carriers with which the levers 341 are each engaged. The carriers, in turn, support the rods 133'', 133''' in the member 7 and also in the member 6. Springs 227 are arranged on the rods 133'' and 133''' to urge the projections 225 and 226 toward their original or inactive position; therefore when a pipe or tubular member is engaged between the projections, the spring will act to hold the pipe in engagement by the projections 225 and 226. Also, the spring will aid in returning projections 225 and 226 to their original spread apart relation after the restraining means has been reengaged to the device is automatically positioned and ready for another load of pipe.

A mechanism of the type described herein has been found entirely satisfactory in use and it eliminates the expensive time consuming manual method of loading drilling pipe or tubular members one by one, as heretofore practiced.

Broadly the invention relates to a loading mechanism, and more particularly to a mechanism for engaging a plurality of tubular members for movement thereof, as desired.

What is claimed is:

1. A tubular loading mechanism including, a frame having spaced elongated members, means on each of said elongated members supported for longitudinal movement relative to each of said elongated members, openings in each of said elongated members for receiving tubular members, said openings facing toward the bottom of each of said elongated members, gripping means pivotally supported on said longitudinally movable means and extending downwardly therefrom and adjacent said receiving openings in each of said elongated members, lever means pivotally supported on each of said elongated members and engaged with said longitudinally movable means, lifting means connected with said pivotally supported lever means for lifting said frame and for moving said lever means about its pivotal support to move said longitudinally movable member whereupon said gripping means may be moved to gripping position, restraining means for locking said lifting means to restrain movement of said lever means to prevent movement of said gripping means to gripping position, until said restraining means is released, and release means operatively connected to said restraining means to release it from holding said lifting means whereupon said gripping members are moved to gripping position when said frame is lifted.

2. The combination recited in claim 1 wherein said frame includes an upwardly extending support post on each of said elongated members, and wherein said lifting means includes a member extending between and slidably carried by said support posts whereby a lifting effort may be applied to said member for lifting said elongated members simultaneously.

3. A tubular loading mechanism including, a frame having spaced elongated members, means on each of said elongated members supported for longitudinal movement relative to each of said elongated members, an upwardly extending support on each of said elongated members, openings in each of said elongated members for receiving tubular members, said openings facing toward the bottom of each of said elongated members, gripping means pivotally supported on said longitudinally movable means and extending downwardly therefrom and adjacent said receiving openings in each of said elongated members, lever means pivotally supported on each of said elongated members and engaged with said longitudinally movable means, a member extending between and slidably carried by said upwardly extending supports, whereby a lifting effort may be applied to said frame, restraining means for restraining relative movement of said member along said supports, release means for releasing said restraining means whereby said member may then move upwardly on said supports when a lifting effort is applied to said last-named member, means connecting said last-named member to pivotally supported lever means so that movement upwardly of said last-named member pivots said pivotally supported lever means to move said longitudinally movable means in each of said elongated members whereupon said gripping means is moved to gripping position.

4. The combination recited in claim 3 wherein spring means are mounted on said longitudinally movable means and in abutting relation with said gripping means to normally urge said gripping means to non-gripping position.

5. A tubular loading mechanism including, a frame having spaced elongated members, means on each of said elongated members supported for longitudinal movement relative to each of said elongated members, an upwardly extending support on each of said elongated members, openings longitudinally arranged on each of said elongated members for receiving tubular members, said openings facing toward the bottom of each of said elongated members, with the openings in one member being aligned with the openings in the other member, gripping means pivotally supported on said longitudinally movable means and extending downwardly therefrom and adjacent each of said receiving openings in each of said elongated members, lever means pivotally supported on each of said elongated members and engaged with said longitudinally movable means in each of said elongated members, a member extending between and slidably carried by said upwardly extending supports, whereby a lifting effort may be applied to said frame, restraining means for restraining relative movement of said last-named member along said supports, release means for releasing said restraining means whereby said last-named member may then move upwardly on said supports when a lifting effort is applied to said last-named member, means connecting said last-named member to said pivotally supported lever means so that movement upwardly of said last-named member pivots said pivotally supported lever means to move said longitudinally movable means in each of said elongated members whereupon said gripping means is moved to gripping position.

6. The combination recited in claim 5 wherein said longitudinally movable means comprises paired members for each of said elongated members, and said pivotally supported lever means comprises paired crank levers on each of said elongated members with one crank lever connected with each of said members to effect movement thereof longitudinally of said elongated members, and said gripping means for the tubular members comprising a plurality of depending projections on each of said paired members, with said projections extending downwardly from said paired members and with one of said projections on each side of said openings for the tubular members so that when said paired members are moved longitudinally by said crank levers, said depending projections are urged to tubular gripping position on each side of said tubular receiving portions.

7. The combination recited in claim 3 wherein said restraining means includes pins pivotally mounted on said member which extends between said supports and adjacent each of said supports, groove means in each of said supports in which said pins are engaged to hold said supports and member extending therebetween in engagement, a rod connected to each of said pins, spring means on said rod normally urging said pin into said groove, said pin and spring being movable to disengage said pin from said groove whereby said member which extends between said supports may be moved therealong.

8. A tubular loading mechanism including a frame having two elongated members, rods supported in each of said elongated members for movement longitudinally relative to said members, openings longitudinally arranged in each of said elongated members for receiving tubular members, said openings facing the bottom of said elongated members, a plurality of downwardly depending members carried by said rods adjacent said openings for gripping tubular objects, crank levers pivotally supported on said elongated members and connected to move said rods longitudinally of said elongated members to urge said projections to gripping position, an upwardly extending support on each of said elongated members, a member extending between and carried by said supports whereby said elongated members may be lifted simultaneously, rods connecting said member which extends between said supports with each of said crank levers, restraining means holding said supports and member extending therebetween against relative movement whereby the mechanism may be lifted without actuating said projections to grip the tubular objects.

9. The combination recited in claim 8 including release means to release said restraining means whereupon said member extending between said supports may move upwardly therealong as the mechanism is lifted to in turn move said crank levers connected therewith to urge said projections to gripping position.

References Cited in the file of this patent
UNITED STATES PATENTS

| | | |
|---|---|---|
| 600,004 | Jensen | Mar. 1, 1898 |
| 851,631 | Swanson | Apr. 23, 1907 |
| 1,060,696 | Naucler | May 6, 1913 |
| 1,918,486 | Onos | July 18, 1933 |
| 2,361,461 | De Mezey | Oct. 31, 1944 |
| 2,597,760 | Strahm | May 20, 1952 |
| 2,805,095 | Cummings et al. | Sept. 3, 1957 |